United States Patent [19]

Steck et al.

[11] Patent Number: 5,464,700
[45] Date of Patent: Nov. 7, 1995

[54] GASKETED MEMBRANE ELECTRODE ASSEMBLY FOR ELECTROCHEMICAL FUEL CELLS

[75] Inventors: Alfred E. Steck, West Vancouver; Jinzhu Wei, North Vancouver, both of Canada

[73] Assignee: Ballard Power Systems Inc., North Vancouver, Canada

[21] Appl. No.: 225,519

[22] Filed: Apr. 11, 1994

Related U.S. Application Data

[63] Continuation of Ser. No. 710,090, Jun. 4, 1991, abandoned.

[51] Int. Cl.$^6$ .............................. H01M 8/10; H01M 8/02
[52] U.S. Cl. .................. 429/30; 429/34; 429/35
[58] Field of Search .................. 429/35, 36, 37, 429/30, 34

[56] References Cited

U.S. PATENT DOCUMENTS

| | | |
|---|---|---|
| 3,134,696 | 5/1964 | Douglas et al. . |
| 3,134,697 | 5/1964 | Niedrach . |
| 3,575,719 | 4/1971 | Nelson et al. .................. 429/35 X |
| 4,066,822 | 1/1978 | Przybyla et al. . |
| 4,212,929 | 7/1980 | Grevstad et al. . |
| 4,225,654 | 9/1980 | Tajima et al. . |
| 4,337,571 | 7/1982 | Grevstad et al. . |
| 4,755,429 | 7/1988 | Nickols et al. . |
| 4,769,297 | 9/1988 | Reiser et al. . |
| 4,774,154 | 9/1988 | Singelyn et al. . |
| 4,826,742 | 5/1989 | Reiser . |
| 4,855,092 | 8/1989 | Fukuda et al. . |
| 4,988,583 | 1/1991 | Watkins et al. .................. 429/30 |
| 5,087,534 | 2/1992 | Ludwig .................. 429/34 X |

FOREIGN PATENT DOCUMENTS

| | | |
|---|---|---|
| 0059931 | 9/1982 | European Pat. Off. . |
| 2398392 | 2/1979 | France . |
| 2410059 | 6/1979 | France . |
| 3323491 | 1/1984 | Germany . |
| 1210693 | 10/1970 | United Kingdom . |
| 1222327 | 2/1971 | United Kingdom . |

OTHER PUBLICATIONS

"The Performance of Hydrocarbons In Ion Exchange Membrane Fuel Cells", *Journal Of The Electrochemical Society*, vol. 109, No. 11, pp. 1092–1096, Niedrach, Nov. 1962.
"Ion–exchange membrane", *SAE Journal*, vol. 70, No. 1, pp. 82–86, Blackmer et al., Jan. 1962.
"SPE Regenerative Hydrogen/Oxygen Fuel Cells For Extraterrestrial Surface Applications", McElroy (1989) (No month) pp. 1631–1636.
"Hydrogen/Oxygen Fuel Cells With In–Situ Product Water Removal". Leonida (Undated).
"SPE Hydrogen/Oxygen Fuel Cells For Rigorous Naval Applications", McElroy et al. (Undated).

*Primary Examiner*—John S. Maples
*Attorney, Agent, or Firm*—McAndrews, Held & Malloy, Ltd.

[57] ABSTRACT

A gasketed membrane electrode assembly for electrochemical fuel cells employs gasketing material at the periphery of the ion exchange membrane, rather than the membrane itself, as a gasket. The gasketing material may be formed from an elastomeric material suitable for cold bonding or bonding by heat and pressure. A nonhydrophilic thermoplastic elastomer is the preferred gasketing material. The gasketed membrane electrode assembly provides a seal between the electrically conductive separator plates that is more effective and economical than assemblies employing the membrane itself as the gasketing material. In an alternative embodiment, a gasketed membrane assembly for use in the humidification portion of a fuel cell employs gasketing material at the periphery of a water permeable membrane.

16 Claims, 2 Drawing Sheets

GASKETED MEMBRANE ELECTRODE ASSEMBLY FOR ELECTROCHEMICAL FUEL CELLS

This is a continuation of application Ser. No. 07/710,090 filed Jun. 4, 1991, now abandoned.

FIELD OF THE INVENTION

This invention relates to electrochemical fuel cells, and, in particular, to a gasketed membrane electrode assembly for solid polymer electrolyte fuel cells.

BACKGROUND OF THE INVENTION

Solid polymer electrolyte fuel cells (SPFCs) have been shown to be reliable for generating electricity by the oxidation of a conventional fuel such as hydrogen. The long demonstrated life and relative simplicity of design make SPFCs particularly suitable for space and transportation applications.

A single solid polymer electrolyte fuel cell comprises an ion exchange membrane separating an anode and a cathode, all of which is interposed between electrically conductive separator plates. A plurality of cells make up an SPFC stack.

The anode and cathode in a solid polymer electrolyte fuel cell are planar in configuration, and are normally formed of porous electrically conductive sheet material such as carbon fiber paper. A suitable catalytic material, such as finely divided platinum, is typically applied to the surfaces of the anode and cathode facing the membrane to render the portions containing the catalytic material electrochemically active.

Typically, flow field grooves are molded or machined on the surfaces of the electrically conductive separator plates facing the anode or the cathode to accommodate reactant fluid distribution and reaction product collection and elimination.

In conventional SPFCs, the solid polymer membrane serves at least three functions. First, the membrane separates the anode from the cathode. Hydrogen fuel is oxidized at the anode to form protons (hydrogen cations), which migrate across the membrane to the cathode. Oxygen is reduced at the cathode and reacts with the migrated hydrogen cations to form water. Second, the electrochemically active region of the membrane serves as a medium through which the hydrogen cations migrate to the cathode. Third, the portion of the membrane extending beyond the electrochemically active region into the space between the separator plates serves as a gasket to prevent reactant gases from escaping to the atmosphere from between the separator plates.

An advantage of solid polymer membranes is their immiscible nature, which facilitates the separation and removal of reaction products. Other advantages of solid polymer membranes include their relative insensitivity to differential pressure between the anode and the cathode, their chemical stability and their non-corrosiveness.

A disadvantage of solid polymer membranes is their high cost. This cost is even greater in SPFCs where the membrane itself is used as a gasket, because more membrane area is required. Where the membrane serves as a gasket, the membrane must extend substantially beyond the electrochemically active region of the membrane and into the space between the graphite separator plates. That portion extending beyond the active region adds to the overall cost of the SPFC, but is not utilized as a medium for cation migration.

Examples of SPFCs in which the solid polymer membrane serves as a gasket include those developed and described by United Technologies Corporation (UTC) for zero gravity applications, rigorous naval applications, and extraterrestrial surface applications. In such UTC fuel cells, a portion of the solid polymer membrane is interposed between the anode frame and the cathode frame and functions as a gasket, preventing reactant gases from escaping to the atmosphere.

There are several disadvantages to configurations employing the membrane itself as a gasket. As already noted, the cost of solid polymer membranes is high, and using a portion of the membrane as a gasket requires a larger membrane area, thus increasing the overall cost of the fuel cell. Use of the membrane as a gasket also exposes the membrane edge to the atmosphere, thereby allowing the evaporation of water, required for effective cation transport, from the membrane. In addition, the gasketing portion of the membrane is in contact with the separator plates at about 70° C.– 80° C. (158° F.–176° F.), thus further promoting the dehydration of the membrane edge and possible degradation of the membrane's physical and chemical properties. For example, contaminants such as various metal ions can leach out from the separator plates and diffuse through the portion of the membrane acting as a gasket to the electrochemically active portion of the membrane, thus reducing the membrane's ability to act as an ion exchange medium. Another disadvantage of SPFCs in which the membrane serves as a gasket is that, where the membrane, in its protonated form, contacts the separator plates, the acidic membrane will corrode the separator plates.

OBJECTS OF THE INVENTION

It is therefore an object of the invention to provide a membrane electrode assembly for solid polymer fuel cells which minimizes the amount of membrane material in the fuel cell by employing a less expensive and more effective gasketing material at the periphery of the membrane, rather than employing the membrane itself as a gasket.

It is a further object of the invention to provide a membrane electrode assembly in which exposure of the edges of the solid polymer membrane to the environment surrounding the fuel cell is avoided, thus preventing dehydration of the membrane.

Another object of the invention is to provide a membrane electrode assembly in which a thinner, more electrochemically efficient membrane can be employed, since the gasketing function is performed by the gasketing material and not by the membrane itself.

Still another object of the invention is to provide a membrane electrode assembly which minimizes or eliminates contact between the membrane and the separator plates, thus reducing any corrosive attack on the separator plates by the acidic membrane, and also reducing contamination of the membrane by contaminants originating in the separator plates.

Further and additional objects will appear from the description, accompanying drawings, and appended claims.

SUMMARY OF THE INVENTION

The foregoing and other objects are achieved by a gasketed membrane electrode assembly comprising an anode and a cathode, each planar in configuration and having an electrochemically active portion. An ion exchange membrane is interposed between the anode and the cathode. A first layer of gasketing material is interposed between the anode and the membrane. A second layer of gasketing material is interposed between the cathode and the membrane. Both layers of gasketing material extend from the periphery of the membrane in a direction away from the electrochemically active portion of the electrodes.

In the preferred embodiment, the periphery of the membrane extends beyond the periphery of the electrodes. The membrane is preferably a solid polymer ion exchange membrane, typically a porous, sulfonated material. The preferred gasketing material is a nonhydrophilic thermoplastic elastomer.

The gasketed membrane electrode assembly is preferably consolidated into a single unit by employing a cold bonding process or by the application of heat and pressure. In the preferred embodiment, the consolidated gasketed membrane electrode assembly is interposed between electrically conductive separator plates such that the gasketing material substantially occupies the space between the periphery of the separator plates, thereby forming a seal.

The electrically conductive separator plates, sometimes referred to as flow field plates, contain flow channels for the transport of fluids to and from the membrane electrode assembly. The separator plates are preferably formed of graphite, but can also be formed of other suitable electrically conductive materials.

In a second embodiment, the gasketed membrane electrode assembly comprises an anode, a cathode, and an ion exchange membrane interposed between the anode and the cathode. The entire anode-membrane-cathode assembly is interposed between layers of gasketing material. A first layer of gasketing material extends from the periphery of the anode on the side facing away from the membrane and in a direction away from the electrochemically active portion of the anode. A second layer of gasketing material extends from the periphery of the cathode on the side facing away from the membrane and in a direction away from the electrochemically active portion of the cathode.

In another embodiment, the gasketed membrane electrode assembly comprises an anode, a cathode, and an ion exchange membrane interposed between the anode and the cathode. A layer of gasketing material extends from the periphery of the anode on the side facing away from the membrane and in a direction away from the electrochemically active portion of the anode. In this embodiment, the periphery of the cathode preferably extends beyond the periphery of the ion exchange membrane, and the periphery of the ion exchange membrane preferably extends beyond the periphery of the anode.

In yet another embodiment, the gasketed membrane electrode assembly comprises a cathode, an anode, and an ion exchange membrane interposed between the anode and the cathode. A layer of gasketing material extends from the periphery of the cathode on the side facing away from the membrane and in a direction away from the electrochemically active portion of the cathode. In this embodiment, the periphery of the anode preferably extends beyond the periphery of the ion exchange membrane, and the periphery of the membrane extends beyond the periphery of the cathode.

In still another embodiment, the gasketed membrane assembly can be employed in the humidification portion of a fuel cell. Such a gasketed humidification membrane assembly comprises a water permeable membrane interposed between layers of gasketing material. The layers of gasketing material extend from the periphery of the membrane in a direction away from the central region of the membrane. The entire gasketed humidification membrane assembly is preferably interposed between separator plates, such that the gasketing material occupies the space between the periphery of the separator plates, thereby forming a seal.

BRIEF DESCRIPTION OF THE DRAWINGS

For a more complete understanding of the invention reference is made to the drawings wherein.

DETAILED DESCRIPTION OF THE DRAWINGS

Figure 1:
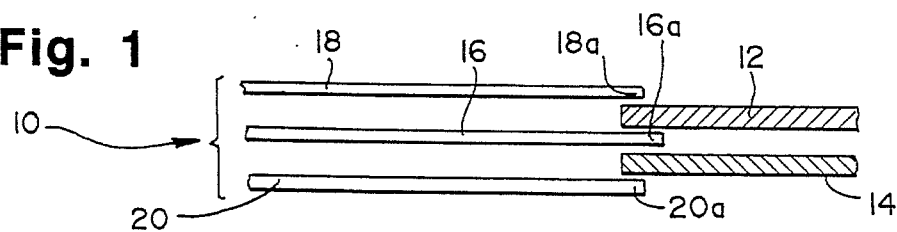
FIG. 1 is an exploded sectional view of the gasketed membrane electrode assembly prior to consolidation into a unitary assembly.

Referring first to FIG. 1 of the drawings, a gasketed membrane electrode assembly 10 prior to consolidation into a single unitary assembly is shown. As FIG. 1 illustrates, the gasketing material layers 12, 14 are placed on either side of the ion exchange membrane 16. Carbon fiber paper based electrodes 18, 20 form the top and bottom portions of the five layer gasketed membrane electrode assembly. In FIG. 1, electrode 18 is the anode and electrode 20 is the cathode.

The portion 16a of the membrane 16 that is interposed between the layers of gasketing material 12, 14 is kept to a minimum, being only large enough to ensure a good seal between the membrane and the gasketing material. Likewise, the portions 18a, 20a of the electrodes 18, 20 that overlap the gasketing material need only be large enough to ensure a good seal between the electrodes and the gasketing material.

Figure 2:
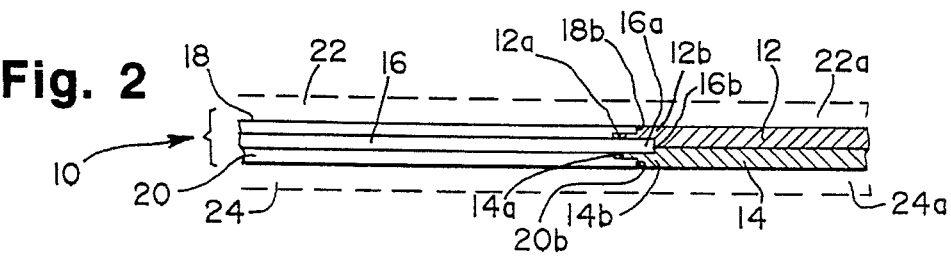
FIG. 2 is a sectional view of the gasketed membrane electrode assembly of FIG. 1 after consolidation into a unitary assembly, and interposed between electrically conductive separator plates to form a fuel cell unit.

FIG. 2 shows the gasketed membrane electrode assembly 10 after consolidation into a single unit and interposed between electrically conductive separator plates 22, 24. Consolidation is achieved either by the application of heat and pressure (where the gasketing material is a thermoplastic elastomer) or by employing a cold bonding process. Cold bonding involves the employment of solvents or adhesives to join the layers together.

Upon consolidation, portions 12a, 14a of the gasketing material layers 12, 14 are compressed between the membrane 16 and the electrodes 18, 20. Other portions 12b, 14b of the gasketing material abut the edge 16b of membrane 16 and the edges 18b, 20b of the electrodes 18, 20. The portions 12b, 14b of the gasketing material layers 12, 14 that abut the edges of the membrane and the electrodes form a seal which effectively prevents leakage of reactant gases and reaction products into the atmosphere from between the separator plates 22, 24.

By forming a seal around the edge 16b of the membrane 16, the gasketing material also prevents the membrane 16 from being exposed to the environment and thus dehydrating.

The gasketing material layers 12, 14 are interposed between the peripheral portions 22a, 24a of the electrically conductive separator plates 22, 24, substantially filling the space between the electrically conductive separator plates 22, 24 around the periphery of the membrane electrode assembly 10, thus functioning as a gasket between the electrically conductive separator plates 22, 24.

The gasketing material layers 12, 14 may be formed of an elastomeric material suitable for in situ molding. A nonhydrophilic thermoplastic elastomer is preferred. Such preferred gasketing materials include Shell's KRATON brand butadiene/styrene copolymer and Monsanto's SANTOPRENE brand ethylene/propylene copolymer.

The ion exchange membrane 16 in its protonated form is acidic. Using an inert gasketing material instead of the ion exchange membrane 16 to fill the space between the peripheral portions 22a, 24a of the electrically conductive separator plates 22, 24 eliminates contact between the ion exchange membrane 16 and the separator plates 22, 24. As a result, there is less or no corrosive attack on the separator plates by the acidic membrane. Also, the electrochemically active portion of the ion exchange membrane 16 is more protected from contamination originating at the peripheral portions 22a, 24a of the electrically conductive separator plates 22, 24.

Figure 3:
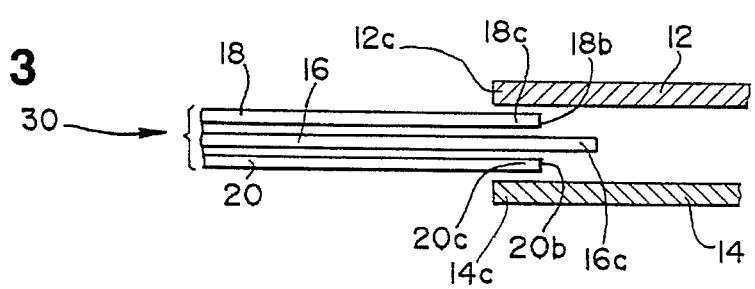
FIG. 3 is an exploded sectional view of a second embodiment of a gasketed membrane electrode assembly prior to consolidation into a unitary assembly.

FIG. 3 shows a second embodiment of a gasketed membrane electrode assembly, designated generally as 30. In FIG. 3, the ion exchange membrane 16 is interposed between the anode 18 and the cathode 20. A portion 16c of the membrane 16 extends beyond the edges 18b, 20b of the electrodes 18, 20. The three layer electrode-membrane-electrode assembly is interposed between layers of gasketing material 12, 14 such that portions 12c, 14c of the gasketing material layers 12, 14 overlap the respective portions 18c, 20c of the electrodes 18, 20 on the sides facing away from the membrane 16.

Figure 4:
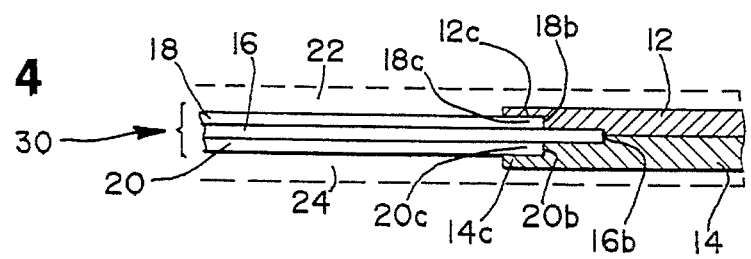
FIG. 4 is a sectional view of the gasketed membrane electrode assembly of FIG. 3 after consolidation into a unitary assembly, and interposed between electrically conductive separator plates to form a fuel cell unit.

FIG. 4 shows the gasketed membrane electrode assembly 30 of FIG. 3 after it has been consolidated into a single unit and interposed between electrically conductive separator plates 22, 24. As in the embodiment illustrated in FIG. 2, the gasketing material layers 12, 14 form a seal against the edges 18b, 20b of the electrodes 18, 20 and the edge 16b of the membrane 16. The portions 12c, 14c of the gasketing material layers 12, 14 overlapping the electrodes 18, 20 are now compressed between the respective electrodes 18, 20 and the respective separator plates 22, 24. Also, the gasketing material layers 12, 14 substantially occupy the space between the electrically conductive separator plates 22, 24 around the periphery of the membrane electrode assembly 30, functioning as a gasket between the separator plates 22, 24.

Figure 5:
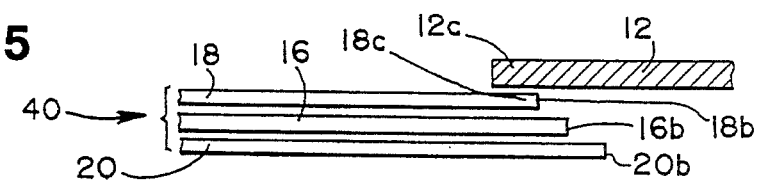
FIG. 5 is an exploded sectional view of a third embodiment of a gasketed membrane electrode assembly prior to consolidation into a unitary assembly.

FIG. 5 illustrates a third embodiment of a gasketed membrane electrode assembly, designated generally as 40, in which the ion exchange membrane 16 is interposed between the anode 18 and the cathode 20 and the three layer electrode-membrane-electrode assembly is arranged in a stepped arrangement. As shown in FIG. 5, the edge 16b of the membrane 16 extends beyond the edge 18b of the anode 18 and the edge 20b of the cathode 20 extends beyond the edge 16b of the membrane 16. A single layer of gasketing material 12 is positioned on top of the electrode-membrane-electrode assembly such that a portion 12c of the gasketing material 12 overlaps a portion 18c of the anode 18 on the side of the anode 18 facing away from the membrane 16.

Figure 6:
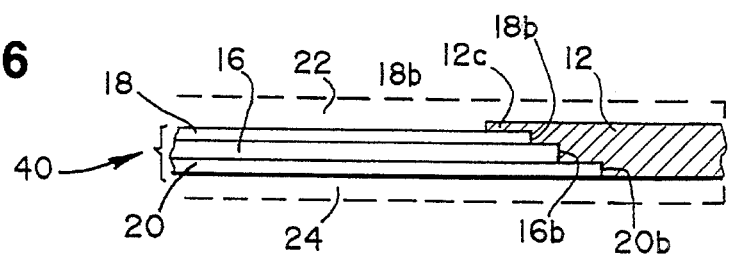
FIG. 6 is a sectional view of the gasketed membrane electrode assembly of FIG. 5 after consolidation into a unitary assembly, and interposed between electrically conductive separator plates to form a fuel cell unit.

FIG. 6 shows the gasketed membrane electrode assembly 40 of FIG. 5 after it has been consolidated into a single unit and interposed between electrically conductive separator plates 22, 24. The gasketing material layer 12 forms a seal against the edges 18b, 20b of the electrodes 18, 20 and the edge 16b of the membrane 16. The portion 12c of the gasketing material layer 12 overlapping the anode 18 is now compressed between the anode 18 and the separator plate 22. Also, as in the embodiments of FIGS. 2 and 4, the gasketing material layer 12 substantially occupies the space between the electrically conductive separator plates 22, 24 around the periphery of the membrane electrode assembly 40, thereby forming an effective seal between the separator plates 22, 24.

Figure 7:
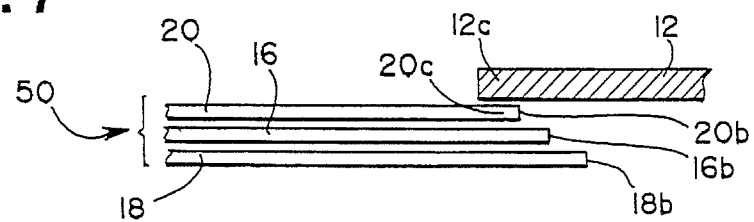
FIG. 7 is an exploded sectional view of a fourth embodiment of a gasketed membrane electrode assembly prior to consolidation into a unitary assembly.

FIG. 7 illustrates a fourth embodiment of a gasketed membrane electrode assembly, designated generally as 50. In this embodiment, as in the third embodiment, the membrane 16 is interposed between the anode 18 and the cathode 20 and the three layer electrode-membrane-electrode assembly is arranged in a stepped arrangement. However, the anode 18 and the cathode 20 are reversed from their positions in the third embodiment. Thus, the edge 16b of the membrane 16 extends beyond the edge 20b of the cathode 20, and the edge 18b of the anode 18 extends beyond the edge 16b of the membrane 16. A single layer of gasketing material 12 is positioned on top of the electrode-membrane-electrode assembly such that a portion 12c of the gasketing material layer 12 overlaps a portion 20c of the cathode 20 on the side of the cathode 20 facing away from the membrane 16.

Figure 8:
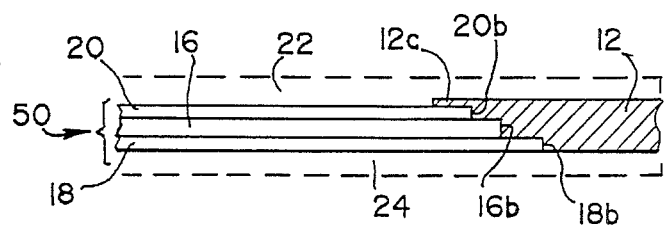
FIG. 8 is a sectional view of the gasketed membrane electrode assembly of FIG. 7 after consolidation into a unitary assembly, and interposed between electrically conductive separator plates to form a fuel cell unit.

FIG. 8 shows the gasketed membrane electrode assembly 50 of FIG. 7 after it has been consolidated into a single unit and interposed between electrically conductive separator plates 22, 24. The gasketing material layer 12 forms a seal against the edges 18b, 20b of the electrodes 18, 20 and the edge 16b of the membrane 16. The portion 12c of the gasketing material 12 overlapping the cathode 20 is now compressed between the cathode 20 and the separator plate 22.

The table below shows the potential cost savings of the present gasketed membrane electrode assembly over conventional membrane electrode assemblies in which the membrane itself serves as the gasket between the separator plates. In order to provide an electrochemically active area of 36 square inches, the present gasketed membrane electrode assembly (referred to as GMEA in the table) requires only 42 square inches of membrane, compared to 81 square inches for the conventional assembly. With the present gasketed membrane electrode assembly, 86% of the membrane is utilized as a cation exchange site, compared to only 44% for the conventional assembly. At a cost of $1.64 per square inch of membrane, the present gasketed membrane electrode assembly results in a cost savings of about $64 per cell, or about $2,251 per 35 cell stack, representing a 48% savings on the membrane cost for a 35 cell stack.

| GASKETED MEMBRANE ELECTRODE ASSEMBLY (GMEA) Membrane Cost Savings | | | | | |
|---|---|---|---|---|---|
| MEA Type | Membrane Area (in$^2$) | % Utilization[1] | Cost[2] ($) | Cost[3] ($) | % Savings[4] |
| Conventional | 81 | 44 | 133 | 4,666 | — |
| GMEA | 42 | 86 | 69 | 2,415 | 48 |
| Active Area | 36 | 100 | 59 | 2,074 | |

[1]Percent of membrane utilized as an ion exchange site (active area), calculated as (Active area/Membrane area) × 100.
[2]Cost of membrane for a single cell, calculated as Membrane Area (in$^2$) × $1.64 per in$^2$.
[3]Cost of 35 cell stack.
[4]Percent savings resulting from using a GMEA over a conventional assembly for a 35 cell stack, calculated as ((Cost of conventional assembly − cost of GMEA)/cost of a conventional assembly) × 100.

Thus, a gasketed membrane electrode assembly is provided that reduces the cost of solid polymer fuel cells by reducing the amount of membrane material needed in the cell.

Figure 9:
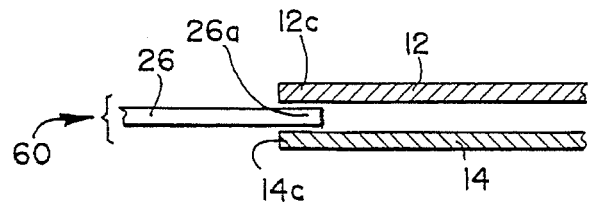
FIG. 9 is an exploded sectional view of a gasketed humidification membrane assembly prior to consolidation into a unitary assembly.

FIG. 9 illustrates a gasketed membrane assembly 60 for use in the humidification portion of a fuel cell, prior to consolidation into a unitary assembly. The gasketed humidification membrane assembly 60 is comprised of a water permeable membrane 26 interposed between layers of gasketing material 12, 14 such that portions 12c, 14c of the gasketing material layers 12, 14 overlap the periphery 26a of the membrane 26. The layers of gasketing material 12, 14 extend from the periphery 26a of the water permeable membrane 26 in a direction away from the central region of the membrane 26.

Figure 10:
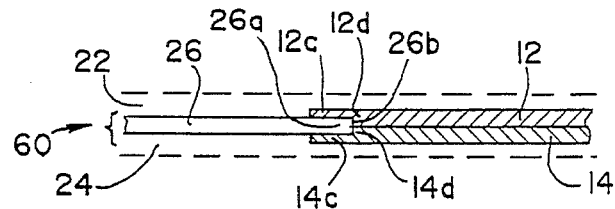
FIG. 10 is a sectional view of the gasketed humidification membrane assembly of FIG. 9 after consolidation into a unitary assembly, and interposed between separator plates.

FIG. 10 shows the gasketed humidification membrane assembly 60 of FIG. 9 after it has been consolidated into a single unit and interposed between separator plates 22, 24. Upon consolidation, the portion 12c of the gasketing material layer 12 overlapping the membrane is now compressed between the membrane 26 and the separator plate 22, and the portion 14c of gasketing material layer 14 overlapping the membrane 26 is now compressed between the membrane 26 and the separator plate 24. Other portions 12d, 14d of the gasketing material layers 12, 14 abut the edge 26b of the water permeable membrane 26, forming a seal which effectively prevents leakage of gases into the atmosphere from between the separator plates 22, 24.

Figure 11:
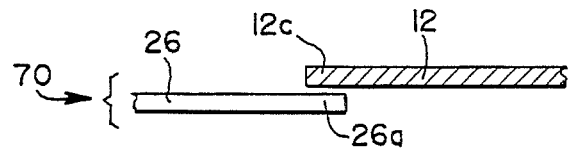
FIG. 11 is an exploded sectional view of a second embodiment of a gasketed humidification membrane assembly prior to consolidation into a unitary assembly.

FIG. 11 illustrates another embodiment of a gasketed humidification membrane assembly, designated generally as 70, prior to consolidation into a unitary assembly. The gasketed membrane assembly 70 is comprised of a water permeable membrane 26 and a layer of gasketing material 12 extending from the periphery 26a of the membrane 26 in a direction away from the central region of the membrane 26. A portion 12c of the gasketing layer 12 overlaps the periphery 26a of the membrane 26.

Figure 12:
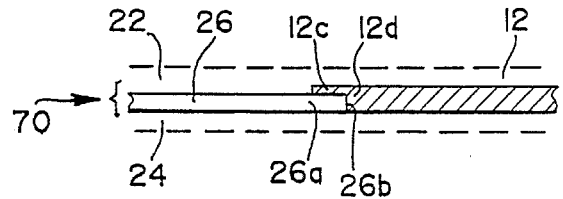
FIG. 12 is a sectional view of the gasketed humidification membrane assembly of FIG. 11 after consolidation into a unitary assembly, and interposed between separator plates.

FIG. 12 shows the gasketed humidification membrane assembly 70 of FIG. 11 after consolidation into a single unit and interposed between separator plates 22, 24. Upon consolidation, the portion 12c of the gasketing material layer 12 overlapping the water permeable membrane 26 is now compressed between the membrane 26 and the separator plate 22. A portion 12d of the gasketing material layer 12 abuts the edge 26b of the water permeable membrane 26, providing a seal which prevents gases from escaping into the atmosphere from between the separator plates 22, 24.

Of course, many modifications and other embodiments of the invention will be recognized by one skilled in the art in view of the foregoing teachings. For example, the described gasketed membrane electrode assembly is not limited to applications in solid polymer electrolyte (ion exchange membrane) fuel cells. The invention is also applicable in electrochemical cells using solid polymer electrolyte technology (e.g. chloralkali cells and water electrolyzers). Therefore, the invention is not to be limited to the exact construction and operation described, and any suitable modifications are intended to be included within the scope of the claims allowed herein. Accordingly, such allowed claims are to be accorded a range of equivalents fully commensurate in scope with the advance made over the prior art.

What is claimed is:

1. A gasketed membrane electrode assembly for use in the electrochemically active portion of a fuel cell, said assembly comprising:

a. an anode comprising electrically conductive sheet material, said anode having a pair of oppositely facing major planar surfaces, each of said anode major planar surfaces having an inner electrochemically active portion and an outer peripheral edge portion;

b. a cathode comprising electrically conductive sheet material, said cathode having a pair of oppositely facing major planar surfaces, each of said cathode major planar surfaces having an inner electrochemically active portion and an outer peripheral edge portion;

c. an ion exchange membrane interposed between one of said anode major planar surfaces and one of said cathode major planar surfaces, said membrane having an outer peripheral edge portion and an inner central portion;

d. a first layer of gasketing sheet material interposed between said one of said anode major planar surfaces and said membrane, said first layer overlapping and extending outwardly away from the outer peripheral edge portion of said one of said anode major planar surfaces in a direction away from the inner electrochemically active portion of said one of said anode major planar surfaces, said first layer overlapping and extending outwardly away from the outer peripheral edge portion of said membrane in a direction away from the inner central portion of said membrane; and e. a second layer of gasketing sheet material interposed between said one of said cathode major planar surfaces and said membrane, said second layer overlapping and extending outwardly away from the outer peripheral edge portion of said one of said cathode major planar surfaces in a direction away from the inner electrochemically active portion of said one of said cathode major planar surfaces, said second layer overlapping and extending outwardly away from the outer peripheral edge portion of said membrane in a direction away from the inner central portion of said membrane.

2. The gasketed membrane electrode assembly of claim 1 wherein the outer peripheral edge portion of said membrane extends outwardly beyond the outer peripheral edge portion of each of said anode major planar surfaces and each of said cathode major planar surfaces.

3. The gasketed membrane electrode assembly of claim 1 wherein said gasketing sheet material is formed from a nonhydrophilic thermoplastic elastomer.

4. The gasketed membrane electrode assembly of claim 1 wherein said assembly is interposed between a pair of electrically conductive separator plates.

5. The gasketed membrane electrode assembly of claim 1 further comprising:

f. means for consolidating said anode, said cathode, said ion exchange membrane, said first layer of gasketing sheet material, and said second layer of gasketing sheet material, whereby a consolidated gasketed membrane electrode assembly is formed.

6. A gasketed membrane electrode assembly for use in the electrochemically active portion of a fuel cell, said assembly comprising:

a. an anode comprising electrically conductive sheet material, said anode having a pair of oppositely facing major planar surfaces, each of said anode major planar surfaces having an inner electrochemically active portion and an outer peripheral edge portion;

b. a cathode comprising electrically conductive sheet material, said cathode having a pair of oppositely facing major planar surfaces, each of said cathode major planar surfaces having an inner electrochemically active portion and an outer peripheral edge portion;

c. an ion exchange membrane interposed between one of said anode major planar surfaces and one of said cathode major planar surfaces, said membrane having an outer peripheral edge portion and an inner central portion, said outer peripheral edge portion of said membrane extending outwardly beyond the outer peripheral edge portion of each of said anode and cathode major planar surfaces;

d. a first layer of gasketing sheet material overlapping and extending outwardly away from the outer peripheral edge portion of the other of said anode major planar surfaces, on the side of said anode facing away from said membrane, in a direction away from the inner electrochemically active portion of said other of said anode major planar surfaces;

e. a second layer of gasketing sheet material overlapping and extending outwardly away from the outer peripheral edge portion of the other of said cathode major planar surfaces, on the side of said cathode facing away from said membrane, in a direction away from the inner electrochemically active portion of said other of said cathode major planar surfaces; and f. means for bonding said first layer of gasketing sheet material to said second layer of gasketing sheet material, whereby a consolidated gasketed membrane electrode assembly is formed.

7. The gasketed membrane electrode assembly of claim 6 wherein said gasketing sheet material is formed from a nonhydrophilic thermoplastic elastomer.

8. The gasketed membrane electrode assembly of claim 6 wherein said assembly is interposed between a pair of electrically conductive separator plates.

9. A gasketed membrane electrode assembly for use in the electrochemically active portion of a fuel cell, said assembly comprising:

a. an anode comprising electrically conductive sheet material, said anode having a pair of oppositely facing major planar surfaces, each of said anode major planar surfaces having an inner electrochemically active portion and an outer peripheral edge portion;

b. a cathode comprising electrically conductive sheet material, said cathode having a pair of oppositely facing major planar surfaces, each of said cathode major planar surfaces having an inner electrochemically active portion and an outer peripheral edge portion, the outer peripheral edge portion of each of said cathode major planar surfaces extending outwardly beyond the outer peripheral edge portion of each of said anode major planar surfaces;

c. an ion exchange membrane interposed between one of said anode major planar surfaces and one of said cathode major planar surfaces, said membrane having an outer peripheral edge portion and an inner central portion, said outer peripheral edge portion of said membrane extending outwardly beyond the outer peripheral edge portion of each of said anode major planar surfaces, said outer peripheral edge portion of each of said cathode major planar surfaces extending outwardly beyond the outer peripheral edge portion of said membrane; and d. a layer of gasketing sheet material overlapping and extending outwardly away from the outer peripheral edge portion of the other of said anode major planar surfaces, on the side of said anode facing away from said membrane, said layer of gasketing sheet material further overlapping and extending outwardly away from the outer peripheral edge portion of said one of said cathode major planar surfaces, on the side of said cathode facing toward said membrane, in a direction away from the inner electrochemically active portion of each of said anode major planar surfaces and each of said cathode major planar surfaces.

10. The gasketed membrane electrode assembly of claim 9 wherein said gasketing sheet material is formed from a nonhydrophilic thermoplastic elastomer.

11. The gasketed membrane electrode assembly of claim 9 wherein said assembly is interposed between a pair of electrically conductive separator plates.

12. The gasketed membrane electrode assembly of claim 9 further comprising:

e. means for consolidating said anode, said cathode, said ion exchange membrane, said layer of gasketing sheet material, whereby a consolidated gasketed membrane electrode assembly is formed.

13. A gasketed membrane electrode assembly for use in the electrochemically active portion of a fuel cell, said assembly comprising:

a. an cathode comprising electrically conductive sheet material, said cathode having a pair of oppositely facing major planar surfaces, each of said cathode major planar surfaces having an inner electrochemically active portion and an outer peripheral edge portion;

b. an anode comprising electrically conductive sheet material, said anode having a pair of oppositely facing major planar surfaces, each of said anode major planar surfaces having an inner electrochemically active portion and an outer peripheral edge portion, the outer peripheral edge portion of each of said anode major planar surfaces extending beyond the outer peripheral edge portion of each of said cathode major planar surfaces;

c. an ion exchange membrane interposed between one of said anode major planar surfaces and one of said cathode major planar surfaces, said membrane having an outer peripheral edge portion and an inner central portion, the outer peripheral edge portion of said membrane extending outwardly beyond the outer peripheral edge portion of each of said cathode major planar surfaces, the outer peripheral edge portion of each of said anode major planar surfaces extending outwardly beyond the outer peripheral edge portion of said membrane; and d. a layer of gasketing sheet material overlapping and extending outwardly away from the outer peripheral edge portion of the other of said cathode major planar surfaces, on the side of said cathode facing away from said membrane, said layer of gasketing sheet material further overlapping and extending outwardly away from the outer peripheral edge portion of said one of said anode major planar surfaces, on the side of said anode facing toward said membrane, in a direction away from the inner electrochemically active portion of each of said anode major planar surfaces and each of said cathode major planar surfaces.

14. The gasketed membrane electrode assembly of claim 13 wherein said gasketing material is formed from a non-hydrophilic thermoplastic elastomer.

15. The gasketed membrane electrode assembly of claim 13 wherein said assembly is interposed between a pair of electrically conductive separator plates.

16. The gasketed membrane electrode assembly of claim 13 further comprising:

e. means for consolidating said anode, said cathode, said ion exchange membrane, said layer of gasketing sheet material, whereby a consolidated gasketed membrane electrode assembly is formed.

* * * * *